United States Patent
Van Westrenen

[15] 3,671,474
[45] June 20, 1972

[54] WATER-THINNABLE CONDENSATION PRODUCTS AND THEIR USE AS PAINT BINDERS

[72] Inventor: William J. Van Westrenen, Delft, Netherlands

[73] Assignee: Shell Oil Company, New York, N.Y.

[22] Filed: June 18, 1969

[21] Appl. No.: 834,531

[30] Foreign Application Priority Data

Jan. 13, 1969 Great Britain..........................1,831/69

[52] U.S. Cl......................260/20, 117/132 BE, 117/132 BF, 117/161 L, 117/161 ZB, 204/181, 260/29.2 E
[51] Int. Cl........................C09d 3/56, C09d 3/66, C09d 5/24
[58] Field of Search..........................260/20, 22 EP, 29.2 EP; 204/181; 117/132 BE, 132 BF

[56] References Cited

UNITED STATES PATENTS

| 3,563,929 | 2/1971 | Guldenpfennig | 204/181 |
|---|---|---|---|
| 3,567,668 | 3/1971 | Guldenpfennig | 204/181 |
| 3,291,858 | 12/1966 | Oosterhof et al. | 260/842 |
| 3,355,401 | 11/1967 | Tanner | 260/18 |
| 3,362,899 | 1/1968 | Gilchrist | 204/181 |
| 3,491,011 | 1/1970 | Le Bras | 204/181 |
| 3,513,083 | 5/1970 | Vitek | 204/181 |

FOREIGN PATENTS OR APPLICATIONS

| 732,680 | 4/1966 | Canada | 260/22 |
|---|---|---|---|
| 962,974 | 7/1964 | Great Britain | 260/22 |

Primary Examiner—Donald E. Czaja
Assistant Examiner—Ronald W. Griffin
Attorney—Joseph W. Brown and Norris E. Faringer

[57] ABSTRACT

The disclosure describes novel condensation products having superior throwing power suitable as electrodeposition paint binders which are the partially neutralized reaction products of a polyepoxide and monocarboxylic acids containing at least 50 percent by weight of ethylenically unsaturated fatty acids, said reaction product having been further esterified with at least 4 percent by weight of an ethylenically unsaturated polycarboxylic acid or anhydride thereof and subsequently reacted with an oil-soluble, heat-non-reactive phenolic resin. The disclosure also describes the process for producing the above-described novel composition.

12 Claims, No Drawings

WATER-THINNABLE CONDENSATION PRODUCTS AND THEIR USE AS PAINT BINDERS

Water-thinnable paint binders are usually prepared by preparing a resin containing free carboxyl groups and by neutralizing the resin completely or partially with an alkaline material, such as a nitrogen base.

For instance, the British Pat. No. 962,974, discloses a process wherein a polyepoxide is completely esterified with a linseed oil fatty acid and the resulting product is reacted with maleic anhydride at 240° C to introduce free carboxyl groups; this maleinized resin is then solubilized in water by neutralization with ammonia and addition of ethylene glycol monobutyl ether, and used as a paint binder.

The use of water-thinnable paint binders and paints is at present well-established. One of the advantages is that they offer the possibility for electro-deposition from solution onto metals to form a pore-free coating in thin layers, even at places difficult to reach with spray gun or brush, such as corners, nooks, and pockets of a work piece.

This ability to extend the formation of electro-deposited films into difficult to reach places is known as the throwing power, which can be measured and expressed in numerical data, dependent on the method used. The throwing power depends mainly on the binder composition, and over the years that electro-deposition of water-thinnable paints has become commercially important, much effort has been devoted to the developments of paint binders with better throwing power. Paints can at present be tested by a refined throwing power test, the tube penetration test, wherein the specimen is a metal strip inserted in a metal tube, the strip and tube are supported in an electro-deposition bath, connected as anode, and the coated length of the strip is measured.

It has now been found that water-thinnable paint binders of superior throwing power can be prepared from condensation products of epoxy resin esters with other resinous materials.

The present invention is thus directed towards a process for the preparation of novel condensation products which are thinnable with water after neutralization and which contain free carboxyl groups comprising (1) reacting a polyepoxide with monocarboxylic acids which contain at least 50 percent by weight of ethylenically unsaturated fatty acids, in an amount of about 0.8 to 1.3 acid equivalent of monocarboxylic acids per hydroxy equivalent of the polyepoxide, (2) reacting the resultant polyester with at least 4 percent by weight, based on the polyester, of an ethylenically unsaturated polycarboxylic acid or an anhydride thereof, and (3) reacting the resulting polycarboxylated polyester at a temperature above 150° C with an oil-soluble, heat-non-reactive phenolic resin.

The coatings prepared from the water-thinnable binders of the invention have very good mechanical properties, and a good chemical resistance.

These novel condensation products may also be described as compositions which are thinnable with water after neutralization and which contain free carboxyl groups, comprising the partially neutralized reaction product of 1. a polyepoxide and
2. monocarboxylic acids containing at least 50 percent by weight of ethylenically unsaturated fatty acids, in an amount of about 0.8 to 1.3 acid equivalent of monocarboxylic acids per hydroxy equivalent of the polyepoxide, said reaction product having been further reacted with
3. at least 4 percent by weight, based on the reaction product of (2), of an ethylenically unsaturated polycarboxylic acid or an anhydride thereof, the reaction product having been additionally reacted at a temperature above 150° C with
4. an oil-soluble, heat-non-reactive phenolic resin.

The present invention also contemplates a process for coating a body capable of carrying an electric current with a uniform coating of the novel condensation products comprising A. immersing said body in an aqueous composition of a partially neutralized reaction product of
1. a polyepoxide and
2. monocarboxylic acids containing at least 50 % by weight of ethylenically unsaturated fatty acids, in an amount of about 0.8 to 1.3 acid equivalent of monocarboxylic acids per hydroxy equivalent of the polyepoxide, said reaction product having been further reacted with
3. at least 4% by weight, based on the reaction product of step (2), of an ethylenically unsaturated polycarboxylic acid or an anhydride thereof, the reaction product having been additionally reacted at a temperature above 150° C with
4. an oil-soluble, heat-non-reactive phenolic resin.
B. passing an electric current through said aqueous composition and through said body to deposit a uniform water insoluble film thereon and
C. curing said film.

POLYEPOXIDES

The polyepoxides to be used in preparing the present invention are described in substantial detail in U.S. Pat. No. 2,956,034 to Simpson. Briefly, they comprise the organic compounds possessing more than one vicinal epoxy group, i.e., more than one

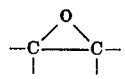

group, per molecule. These compounds may be saturated or unsaturated, aliphatic, cycloaliphatic, aromatic or heterocyclic and may be substituted with substituents such as chlorine, hydroxyl groups, ether radicals and the like. They may be monomeric or polymeric.

For clarity, many of the polyepoxides and particularly those of the polymeric type are described in terms of "epoxy equivalent" values. This expression refers to the average of the number of epoxy groups per molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine at the boiling point and then back-titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer. In the case of polymeric polyepoxides the material may contain some of the monomeric epoxide or have some of the epoxy groups hydrated or otherwise reacted and/or contain macromolecules of various molecular weights. In this case the epoxy equivalent may be a fractional value and may be only slightly higher than 1. Another suitable description of the epoxide content of an epoxy compound is in terms of epoxy equivalents per 100 grams.

Detailed discussion of polyepoxides suitable for use in this invention is found in the Simpson patent and in U.S. Pat. No. 2,633,458 to Shokal. So much of the disclosures of the Shokal patent as is relative to examples of polyepoxides is incorporated by reference into this specification.

Suitable monomeric polyepoxide compounds include diepoxidized alkadienes, diepoxidized alkenylcyclohexenes, diglycidyl ethers of dihydroxy aromatics and other polyglycidyl ethers of polyhydroxy aromatics, halo-substituted derivatives of such compounds, diepoxy ethers and the like.

Suitable polyepoxides further include the epoxidized esters of polyethylenically unsaturated monocarboxylic acids, such as epoxidized natural poly-unsaturated oils. Another group is the epoxidized esters of unsaturated monohydric alcohols and polycarboxylic acids. Another group is the epoxidized esters of unsaturated alcohols and unsaturated carboxylic acids.

Another group is the epoxidized derivatives of polyethylenically unsaturated polycarboxylic acids. Another group is the epoxidized polyesters obtained by reaction of an unsaturated polyhydric alcohol and/or unsaturated polycarboxylic acid or anhydride. Another group is the glycidyl esters of polymerized unsaturated long-chain acids, such as dimer acids and trimer acids described hereinafter. Another group is the glycidyl esters of polybasic acids such as phthalic, o-phthalic acid.

Examples of the polymeric polyepoxides suitable for use in the invention include the polyepoxypolyhydroxy polyethers obtained by reacting a polyhydric alcohol or polyhydric phenol with a polyepoxide.

Other polymeric polyepoxide compounds include the polymers and copolymers of the epoxy containing monomers possessing at least one polymerizable ethylenic linkage. When this type of monomer is polymerized in the substantial absence of alkaline or acidic catalyst such as in the presence of heat, oxygen, peroxy compounds, actinic light and the like, it undergoes additional polymerization at the multiple bond leaving the epoxy group uneffected. These monomers may be polymerized with themselves or with other ethylenically unsaturated monomers.

The polyepoxides that are particularly preferred for use in the compositions of this invention are the polyglycidyl ethers and particularly the polyglycidyl polyethers of polyhydric phenols and those of polyhydric alcohols. The polyglycidyl ethers of polyhydric phenols can be obtained by reacting a polyhydric phenol with an excess, e.g., 4 to 10 mole excess, of a halogen-containing epoxide in an alkaline medium.

Epihalohydrin, particularly epichlorohydrin is usually preferred as the halogen-containing epoxide. The halogen-containing epoxides are further exemplified by epibromohydrin, 3-chloro-1,2-epoxybutane, 3-bromo-1,3-epoxyhexane, 3-chloro-1,2-epoxybutane, 3-bromo-1,3-epoxyhexane, 3-chloro-1,2-epoxyoctane and the like.

Preferred polyglycidyl polyethers of polyhydric phenols are polyglycidyl ether of 2,2-bis(4-hydroxyphenyl)propane which polyglycidyl polyethers have molecular weights of about 340–1500 and epoxy equivalent weights of about 170–1,000. Polyglycidyl polyethers of this type may be represented by the general formula:

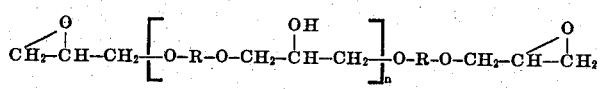

in which R represents the divalent group

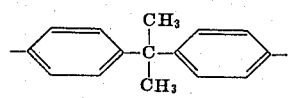

and n has an average value of from 0 to about 4; during the preparation some of the terminal glycidyl groups may be hydrated to

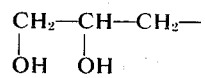

groups by reaction with water.

Particularly preferred are polyglycidyl ethers of 2,2-bis(4-hydroxyphenyl)propane having a molecular weight of about 700–1,000 and an epoxy equivalent weight of about 400–600, in view of the favorable ratio between epoxy groups and free hydroxyl groups.

The ethylenically unsaturated fatty acids to be used are preferably those having more than one ethylenic group per molecule. Examples from this group of preferred fatty acids are fatty acids from drying oils such as linseed oil, tung oil, soyabean oil, fish oil, cotton seed oil, oiticica oil, perilla oil, sunflower seed oil; dehydrated castor oil fatty acids, tall oil fatty acids, and tall oil.

The monocarboxylic acids can be reacted with the polyglycidyl polyether in one step until the esterification is virtually complete, i.e., when the acid number does not further decrease and the amount of water formed in the reaction does not further increase. Esterification catalysts may be used, such as sodium carbonate, calcium oxide, zinc oxide, stannous oxide, calcium naphthenate, stannous octoacte, tertiary amines, quaternary ammonium salts, and triphenyl phosphine, or mixtures thereof.

The esterification is carried out at elevated temperature, preferably at temperatures of about 200°–260° C. During esterification water is formed by reaction of carboxyl groups of the fatty acid with hydroxyl groups of the hydroxy ester. This water is removed by evaporation, for instance by azeotropic distillation with a few percent by weight of xylene, for instance 3 percent by weight, based on the total weight of reactants, the water being separated from the xylene in a water trap after cooling. The esterification reaction is completed when further decrease in the acid number of the mixture becomes negligible; this is usually after 6–10 hours at reaction temperatures of 240°–260° C. When the heating periods are longer the viscosity often rises to an undesirable extent without any further decrease in the acid number.

In case that part of the monocarboxylic acids envisaged are rosin acids or aromatic monocarboxylic acids, it is preferred to react the polyglycidyl polyether of the polyhydric phenol first with from about 0.3 to 1.0 acid equivalent of rosin acids or aromatic polycarboxylic acids per epoxy equivalent, and react the resulting hydroxy-containing ester in a subsequent stage with about 0.8 to 1.2 acid equivalent of ethylenically unsaturated fatty acid per hydroxy equivalent of the hydroxy-containing ester.

Rosin acids, also known as rosin or colophony, are largely tricyclic monocarboxylic acids, such as abietic acid and the related acids levopimaric acid, neoabietic acid, dextropimaric acid, dehydroabietic acid, dihydroabietic acid, tetrahydroabietic acid, isodextropimaric acid. Rosin acids as used in this specification also include hydrogenated rosin acids which have an enlarged content of dihydro and tetrahydroabietic acid, and hydrogenated related acids, and disproportionated rosin acids, which by a disporportionation process contain an enlarged content of dehydroabietic acid on one hand, and an enlarged content of dihydro- and tetrahydroabietic acid on the other hand. Hydrogenation or disproportionation of rosin acids may improve color stability of the rosin acids or of products obtained therefrom.

Aromatic monocarboxylic acids that can be used are, for example, p-methyl benzoic acid, p-ethyl benzoic acid, and p-tertiary butyl benzoic acid, and preferably benzoic acid.

In the above-noted modification the reaction of rosin acids or aromatic monocarboxylic acids with the polyglycidyl polyethers is carried out at elevated temperature, preferably between about 150° and 250° C, and under these conditions the acids react mainly with the epoxy groups of the polyepoxide by an addition reaction which may be represented by the general formula:

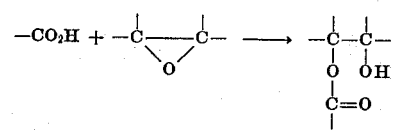

Reaction of the rosin acids or aromatic monocarboxylic acids with hydroxyl groups of the polyepoxide may also take place, but is generally of minor importance as the epoxy groups are more reactive than hydroxyl groups.

The amount of ethylenically unsaturated fatty acids for the subsequent esterification can be calculated by deducting the acid equivalent of rosin acids or aromatic monocarboxylic acids from the potential hydroxy equivalents of the polyglycidyl polyether; the potential hydroxy groups are the sum of free hydroxy groups and twice the epoxy groups, as an epoxy group has the functionality of two hydroxy groups for esterification.

The esterification with the monocarboxylic acids provides polyesters which contain at most a small amount of hydroxy groups; in view of the fact that the esterification is an equilibrium reaction even on use of an excess of monocarboyxlic acid, the polyester will still have in most cases a small, but detectable hydroxy value which, however, will not noticeably interfere with subsequent reactions. Before adding the unsaturated polycarboxylic acid or carboxylic acid anhydride the polyester is preferably cooled, for example, to 100°–200° C. The ethylenically unsaturated polycarboxylic acid is preferably a dibasic acid, such as fumaric acid or maleic acid. It is preferred to use an anhydride such as maleic anhydride. The ethylenically unsaturated polycarboxylic acid or its anhydride reacts with the completely esterified polyether mainly by addition reactions with the hydrocarbon radical of the unsaturated fatty acid groups. The reaction temperature is preferably above 175° C, for instance 190°–210° C. With higher reaction temperatures, such as 230°–250° C, the viscosity may rise considerably when using large quantities of maleic anhydride, while long reaction times may result in gelling. The maintaining of low reaction temperatures, such as 190°–210° C, is favorable for obtaining low-viscosity products. In general, the reaction time is from 20 minutes to more than one hour. It is advisable to control the course or reaction by measuring the viscosity. The quantity of unsaturated polycarboxylic acid or its anhydride is above 4 percent by weight, based on the weight of the polyester. Maleic anhydride is preferably used in quantities of from 4 to 10 percent by weight. The range of reactions of the polyglycidyl polyether with the monocarboxylic acids and with unsaturated polycarboxylic acids or anhydrides thereof is preferably carried out in an inert, oxygen-free atmosphere, for instance, by passing nitrogen through or over the reaction mixture.

The polycarboxylated polyester is reacted with an oil-soluble, heat-non-reactive phenolic resin in weight ratios of about 100:20 to 100:30 at temperatures which are above 150° C, and preferably between about 180° and 220° C. The oil-soluble, heat-non-reactive phenolic resins are preferably reaction products of formaldehyde with a para-substituted phenol, such as p-phenyl phenol, p-cyclohexyl phenol, p-tert-butyl phenol and p-tert-amyl phenol. The para-substituent provides oil solubility. The heat-non-reactive phenolic resins of this type have usually been prepared with a phenol/formaldehyde ratio of at most 1:1, with acidic catalysts; they are mainly of the novolac type, which means that they contain virtually no methylol groups. The expression heat-non-reactive is used to distinguish them from the heat-reactive phenolic resins, which are of the resole-type and have a substantial number of methylol groups. The heat-reactive phenolic resins react with drying oils and derivatives thereof with further condensation of methylol groups, and usually with considerable foaming by elimination of water. The heat-non-reactive phenolic resins do in fact react by heating, but not as vigorously as the heat-reactive phenolic resins, and without inconvenient foaming. The expressions heat-reactive and heat-non-reactive with regard to phenolic resins are generally used in the art, and phenolic resins of both types are well-known commercial products.

In the present invention the polycarboxylated polyester and the oil-soluble, heat-non-reactive phenolic resin have to be heated together at temperatures above 150° C to obtain a condensation product with advantageous properties. By simple mixing of the two components the phenolic resin does not dissolve on subsequent neutralization and dilution with water; heating at 150° C or below does not lead to products which would provide high throwing power in an electrodeposition bath, as is demonstrated in a comparative example below. The condensation product, which contains free carboxyl groups, is cooled and can immediately be neutralized or be stored and transported as such. The neutralization agent may be an alkali hydroxide, such as potassium hydroxide; a nitrogen base is preferred, such as ammonia or a primary, secondary or tertiary aliphatic or cycloaliphatic amine, for instance, triethylamine, beta-dimethyl aminoethanol, monoethanol amine, diethanolamine, triethanolamine, monoisopropanolamine, diisopropanolamine, cyclohexylamine, morpholine, piperidine and piperazine. The quantity of neutralization agent is selected in such a way, that at least 40 percent of the carboxyl groups are neutralized. The pH of the neutralized binder depends on the degree of neutralization. If all the carboxyl groups are neutralized the pH is higher than when only 70 or 50 percent of the carboxyl groups are neutralized. Complete neutralization usually gives products which dissolve in water completely without any haziness; in the case of partial neutralization the solutions in water are often somewhat hazy. The adjustment to a certain pH by means of partial neutralization may be desired in connection with proper dispersion of pigments.

A lyotropic solvent, such as an ethylene glycol monoalkyl ether, for instance, ethylene glycol monobutyl ether, is preferably added to promote the clear solubility in water. Such lyotropic solvents are preferably used in quantities up to 50 percent by weight, based on the weight of the carboxyl-containing condensation product. In view of the rather high viscosities of the condensation products it is advisable to add the solvent or a portion thereof, for example, 10 parts by weight of lyotropic solvent per 100 parts by weight of condensation product, during the cooling of the reaction product, another amount after cooling and then to add the neutralization agent.

The completely or partially neutralized products may be stored, if desired thinned with water, for a long time without substantial decrease in pH and without precipitation or phase separation taking place.

The solutions of the completely or partially neutralized products may be processed with pigments to paints in the conventional way, for instance, by mixing in a ball mill, on a paint roller mill, etc. For application by spraying, brush, roller, or dipping driers may be added in conventional quantities. As driers cobalt naphthenates and octoates are preferably used, for instance, in quantities up to 0.04 percent by weight of Co, based on the weight of the binder. Other naphthenates and octoates, such as those of zinc, calcium, manganese, and lead may also be used. If desired, other curing components, such as urea formaldehyde resins and melamine formaldehyde resins, may also be added.

Paints and varnishes containing the present binders may be applied to articles in the usual way, for instance, by brush, roller or spraying. They are very suitable for electrodeposition on metals from a solution or dispersion, the metal to be coated serving as anode. The coat applied may be cured by any conventional means, preferably by accelerated drying at elevated temperature, such as about 100°–200° C.

The following examples illustrate particular embodiments of the present invention, including the preferred embodiments. The invention is not to be interpreted as being limited by the illustrative examples, which are presented only to facilitate a better understanding thereof. Unless otherwise specified, "parts" is parts by weight.

The throwing power was examined according to the "tube penetration test" described in Journal of Paint Technology, Vol. 38, (1966), page 454. This method can be summarized as follows: a 37.5 cm long, 1.25 cm wide strip of metal to be coated is inserted into a 1.56 cm internal diameter tube of the same material and 30 cm length. Tube and strip are inserted in an electrodeposition bath, connected as anode, and coated for the desired length of time. The well coated length of the strip is recorded.

EXAMPLE 1

The following reactants were used:

A polyglycidyl polyether of 2,2-bis(4-hydroxyphenyl)propane having

| | |
|---|---|
| 0.214 epoxy equivalent/100 g and 0.252 free hydroxy equivalent/100 g (total hydroxy equivalents 8.85) | 1299.6 parts |
| Linseed oil fatty acids (carboxyl equivalents 10.60) | 2970.5 parts |
| Triphenyl phosphine | 2.28 parts |

In a four-necked flask with stirrer, thermometer, gas inlet tube, reflux condenser with water trap, and heating jacket the above quantities of polyglycidyl ether, linseed oil fatty acids and triphenylphosphine were gradually heated to 240° C in a nitrogen atmosphere and maintained at this temperature for 5 hours. The water formed by the reaction was removed by azeotropic distillation with xylene. 100 Parts by volume of water was collected in the water trap. The acid value of the product was 33.4 and the viscosity 5 poises at 50° C.

2,800 Parts of the above ester and 260 parts of maleic anhydride were heated for two hours at 195° C. The viscosity of the maleinized ester was 63 poises at 50° C. 752 Parts of an oil-soluble, heat-non-reactive resin, the reaction product of formaldehyde with paraphenylphenol were added. The mixture was heated during 75 minutes at a temperature of 200° C. The resulting condensation product had a viscosity of 725 poises at 50° C and an acid value of 95. The condensation product was cooled to 85° C, diluted with 953 parts of ethylene glycol monobutyl ether, and cooled to ambient temperature.

Samples of this diluted product (80 weight percent solids) were neutralized with 0.6 equivalent triethyl amine (TEA) and diisopropanol amine (DIPA) per carboxyl equivalent, and diluted with demineralized water to provide 10 percent by weight solutions. The solutions were slightly hazy.

The pH stability of these solutions was as follows:

| Temp. °C | Type of Amine | pH Initial | 1 Week | 1 Month | 2 Months |
|---|---|---|---|---|---|
| 23 | TEA | 8.6 | 8.3 | 8.3 | 8.3 |
| 23 | DIPA | 8.2 | 8.0 | 8.0 | 7.9 |
| 40 | TEA | 8.6 | 8.2 | 8.0 | 7.8 |
| 40 | DIPA | 8.2 | 8.0 | 7.9 | 7.7 |

EXAMPLE 2

Use of the condensation product of Example 1 (80 weight percent solids) in a primer, and comparison with another primer.

A mixture of the following components was compounded on a three-roll-mill:

| | |
|---|---|
| red iron oxide | 208.8 parts |
| titanium dioxide | 121.8 parts |
| clay | 17.4 parts |
| 80 weight % condensation product of Example 1 | 255.0 parts |

Part of the mill compound (430.7 parts) was mixed with a further quantity of the 80 weight percent condensation product of Example 1 (688.0 parts), diisopropanol amine (177.1 parts of a 50 weight percent solution in water), and demineralized water (4504.2 parts). The paint (5,800 parts) had a solids content of 16.3 percent by weight, a pigment/binder ratio of 0.36 by weight, a pH of 8.2 and a specific resistance of 790 Ω cm at 23° C. This primer was deposited onto phosphated steel panels in an electrodeposition bath under the following conditions.

| | |
|---|---|
| Area coated per panel | 335 cm² |
| Temperature of paint | 24° C |
| Electrode separation | 15 cm |
| Deposition voltage | 160 |
| Deposition final amperage | 0.33 |
| Deposition time | 2 minutes |

The panels were stoved during 30 minutes at 175° C and tested for chemical and physical properties. The results are summarized in Table I below under A.

The results under B are for a water-thinnable paint which contained as the binder the resin described in co-assigned copending U.S. application Ser. No. 468,670, now abandoned, Example IV (this is essentially the same polycarboxylated polyester as described in Example 1 before reaction with the phenolic resin), formulated and compounded as described above for the condensation product of Example 1.

TABLE I

| | A | B |
|---|---|---|
| Film thickness | 30 | 33 |
| Film appearance[1] | 9 | 6 |
| Buchholz Hardness[2] | 130 | 80 |
| Sward-Rocker Hardness | 34 | — |
| Ericksen penetration[3] | 8 mm | 8 mm |
| Ericksen reverse impact | 6 mm | 7 mm |
| Mandrel bend | pass 1/8" | pass 1/8" |
| Humidity cabinet[4], 1000 hrs | no attack | 9 D blistering |
| Resistance to 5 weight % NaOH at 23° C[5] | 2 days: 7 F blistering | 4 hours: total loss of adhesion |

1) Visual ratings on the scale 10 to 0.
2) DIN 53153.
3) DIN 53156.
4) DEF 1053.
5) ASTM D714-56.

Whereas on continuous circulation at room temperature paint B showed serious pigment settling and gave rough deposits after a period of 8–10 days, paint A still gave coatings of good appearance after 2–3 months' circulation, and there was no settlement of pigment in this period of time.

EXAMPLE 3

| | |
|---|---|
| The polyglycidyl ether used in Example 1. (total hydroxy equivalents 10.0) | 1470.0 parts |
| Linseed oil fatty acids (11.0 carboxyl equivalents) | 3080.0 parts |
| Triphenylphosphine | 3.47 parts |

Using the equipment and technique as described in Example 1 esterification is carried out at 240° C for 10 hours. The acid value is then 19.4 and the viscosity of the ester 12.5 poises at 50° C. 700 Parts of the above ester and 54 parts of maleic anhydride were heated for two hours at 195° C. 182.7 parts of the paraphenylphenol-derived, oil-soluble, heat-non-reactive resin used in Example 1, were added and heating continued for 75 minutes at 200° C. The acid value of this product was 75. The condensation product was cooled to 85° C, diluted with 234 parts of ethylene glycol monobutyl ether and cooled to ambient temperature. This diluted product (80 weight percent solids) was partially neutralized with diisopropanolamine (0.6–0.7 equivalents per carboxyl equivalent). These neutralization products could be diluted infinitely with demineralized water to give stable solutions which were clear to slightly hazy.

EXAMPLE 4

Using the condensation product obtained in Example 3 an electro-deposition primer was formulated as follows:

On a three-roll mill were compounded:

| | |
|---|---|
| Red iron oxide | 208.8 parts |
| Titanium dioxide | 121.8 parts |
| Clay | 17.4 parts |
| 80 weight % condensation product of Example 3 | 255.0 parts |

The mill compound (391.0 parts) was mixed with 80 weight percent condensation product of Example 3 (640.2 parts), diisopropanol amine (159.2 parts of a 50 weight percent solution in water) and demineralized water (4609.6 parts). This paint had a solids content of 15 percent by weight, a pigment/binder ratio of 0.35 by weight, a pH of 8.7 and a specific resistance of 1193 Ω cm at 23° C.

The paint was electrodeposited on phosphated steel panels under the same conditions as in Example 2, and the panels were stoved at 175° C for 30 minutes. Mechanical and chemical properties were essentially equal to those given in Table I for paint A.

The throwing power in a range of voltages from 100 up to 250 V (all well under the rupture voltage) on phosphated steel strips was the maximum obtainable, namely 27.5 cm (11 inches).

For comparison, paint B described in Example 2 had a throwing power of only 7.5 cm (3 inches) at 80 V (this is slightly under the rupture voltage).

EXAMPLE 5

Example 3 was repeated, with the exception that the polycarboxylated polyester and the phenolic resin were reacted at 150° C. This condensation product on dilution and neutralization as in Example 3, gave slightly hazy solutions in water. This demonstrates that at 150° C some reaction occurred, as the phenolic resin on mere mixing with the polycarboxylated polyester did not dissolve on neutralization and dilution with water. The product was compounded and formulated as in Example 4 and electrodeposited on phosphated steel panels under the same conditions as in Example 2; the panels were stoved at 175° C during 30 minutes. Mechanical and chemical properties determined were essentially equal to those given in Table I for paint A. The throwing power, however, was only 7.5 cm in the "tube penetration test at 150 V", this is the same low value as found for the comparative paint B.

SUMMARY OF COMPARATIVE DATA

To facilitate the review of some performance data, a summary is given below in Table II, with indication + for good performance (++ for excellent performance) and − for inferior performance.

TABLE II

|  | within the Invention Ex. 3 and 4 | Outside the Invention | |
|---|---|---|---|
|  |  | Paint B | Example 5 |
|  | Polycarboxylated Polyester + Phenolic Resin Reacted above 150° C | Polycarboxylated Polyester | Polycarboxylated Polyester + Phenolic Resin Reacted at 150° C |
| Mechanical | + | − | + |
| Chemical | + | − | + |
| Throwing power | ++ | − | − |

I claim as my invention:

1. A process for the preparation of novel condensation products which are thinnable with water after neutralization and which contain free carboxyl groups comprising (1) reacting a polyglycidyl polyether of a polyhydric phenol with monocarboxylic acids which contain at least 50 percent by weight of ethylenically unsaturated fatty acids, in an amount of about 0.8 to 1.3 acid equivalent of monocarboxylic acids per hydroxy equivalent of the polyepoxide, (2) reacting the resultant polyester with at least 4 percent by weight, based on the polyester, of an ethylenically unsaturated polycarboxylic acid or an anhydride thereof, and (3) reacting 100 parts by weight of the resulting polycarboxylated polyester at a temperature above 150° C with 20 to 30 parts by weight of an oil-soluble, heat-non-reactive, virtually methylol free phenolic resin which is a reaction product of a para-substituted phenol with formaldehyde at phenol/formaldehyde ratio of no more than 1:1.

2. A process as in claim 1, wherein the ethylenically unsaturated fatty acids have more than one ethylenic group per molecule.

3. A process as in claim 1, wherein the polyglycidyl polyether is a polyglycidyl polyether of 2,2-bis(4-hydroxyphenyl)propane.

4. A process as in claim 3, wherein the ethylenically unsaturated polycarboxylic acid or anhydride is maleic acid or maleic anhydride used in an amount between 4 and 10 percent by weight of the polyester.

5. A process as in claim 1, wherein the polycarboxylated polyester is reacted with the oil-soluble, heat-non-reactive phenolic resin at a temperature between 180° and 220° C.

6. A process as in claim 1, wherein at least 40 percent of the carboxyl groups in the condensation product formed in step 3 is neutralized.

7. A composition thinnable with water after neutralization and which contains free carboxyl groups, comprising the partially neutralized reaction product of
 1. a polyglycidyl ether of a polyhydric phenol and
 2. monocarboxylic acids containing at least 50 percent by weight of ethylenically unsaturated fatty acids, in an amount of about 0.8 to 1.3 acid equivalent of monocarboxylic acids per hydroxy equivalent of the polyepoxide, said reaction product having been further reacted with
 3. at least 4 percent by weight, based on the reaction product of (2), of an ethylenically unsaturated polycarboxylic acid or an anhydride thereof, 100 parts by weight of the reaction product having been additionally reacted at a temperature above 150° C with
 4. 20 to 30 parts by weight of an oil-soluble, heat-non-reactive, virtually methylol free phenolic resin which is a reaction product of a para-substituted phenol with formaldehyde at a phenol/formaldehyde ratio no more than 1:1.

8. A composition as in claim 7, wherein the ethylenically unsaturated fatty acids have more than one ethylenic group per molecule.

9. A composition as in claim 7, wherein the polyglycidyl ether is a polyglycidyl ether of 2,2-bis(4-hydroxyphenyl)propane.

10. A composition as in claim 9, wherein the ethylenically unsaturated polycarboxylic acid or anhydride is maleic anhydride used in an amount between 4 and 10 percent by weight of the polyester.

11. A process for coating a body capable of carrying an electric current with a uniform coating, comprising:
 a. immersing said body in an aqueous composition of claim 7,
 b. passing an electric current through said aqueous composition and through said body to deposit a uniform water insoluble film thereon, and
 c. curing said film.

12. An article of manufacture comprising a body capable of carrying an electric current coated uniformly with the composition of claim 11.

* * * * *